Nov. 6, 1962  K. P. ABICHANDANI ETAL  3,062,487
AIRCRAFT ACCELERATION LIMITER

Filed Feb. 1, 1960  6 Sheets-Sheet 1

FIG.1.

INVENTORS
Krishin P. Abichandani
Edwin H. Krug
Thomas E. Hainsworth
Martin W. Story
BY
AGENT

INVENTORS.
Krishin P. Abichandani
Edwin H. Krug
Thomas E. Hainsworth
Martin W. Story
BY Richard P. Alberi
AGENT

United States Patent Office 3,062,487
Patented Nov. 6, 1962

3,062,487
AIRCRAFT ACCELERATION LIMITER
Krishin P. Abichandani, Los Angeles, Calif., and Edwin H. Krug, Thomas E. Hainsworth, and Martin W. Story, Grand Rapids, Mich., assignors to Lear, Incorporated
Filed Feb. 1, 1960, Ser. No. 5,887
13 Claims. (Cl. 244—77)

This invention relates to aircraft control systems and more particularly to improvements in apparatus for limiting the acceleration forces which are detrimental to the aircraft and its contents.

Due to the extended flight regime encountered by modern high performance aircraft, it is no longer practical to prevent over-stressing of the airframe by physically limiting the control surface authority. Any such system would necessitate varying control surface limit as a function of control effectiveness. In this connection it should be noted that control effectiveness is a function of both airspeed and altitude.

Present systems may be categorized into those applicable to manual controls and those which are incorporated in automatic flight control systems. The present systems used with manual control only provide a warning indication. The warning indication may be the shaking of the control stick, a flashing light or the sounding of a bell or buzzer. The disadvantage of the present manual control systems is that not positive action is taken to alleviate the situation.

Present automatic flight control systems incorporating acceleration protection may be classified in two groups, the first group being the torque limiting devices. In the torque limiting device the torque exerted by the servo motor is usually transmitted through some type of a slip clutch. The slip clutch breakaway torque is preset at a given value. Air rushing against the associated control surface causes a torque to be exerted on the slip-clutch. When the torque reaches the preset value the clutch slips thereby limiting any further movement of the control surface in the same direction. The principle is that the air pressure against a given control surface is a function of acceleration in a direction affected by that control surface. However, air density varies with altitude and therefore for a given acceleration the pressure on the control surface varies with the altitude, making it very difficult if not impossible to find a single torque setting which provides adequate safety over a wide range of altitudes without placing undue restrictions on the safe performance of the aircraft.

A second known automatic flight control system is the automatic pilot cut-off. The autopilot is disengaged when the value of a certain parameter, e.g., a given acceleration and pitch rate, reaches a preset value. In the case of the automatic pilot cut-off, a combined electrical signal from the aircraft pitch rate gyro and normal acceleration detector or other sensing system cuts out the autopilot if the combined signal reaches the preset value. The disadvantage of the automatic pilot cut-off is that no limit is placed on the aircraft once the autopilot is disengaged and no corrective action is taken other than disconnecting the autopilot. The pilot can still maneuver the plane into an excessive acceleration situation and if the excessive acceleration were caused by either a faulty control servo or trim tab, the cut-off of the autopilot would not save the aircraft from over-stress.

It is therefore an object of this invention to provide not only a warning indication of high aircraft acceleration, but also to provide a corrective action to limit this acceleration.

It is another object of this invention to provide a means for sensing acceleration along an axis normal to the horizontal axis of an aircraft and inhibiting acceleration above a preset value along that axis.

A furthere object of this invention is to provide a system for aircraft for detecting acceleration along an axis normal to the horizontal axis of an aircraft above a preset value wherein an inhibiting force is applied to return the aircraft to accelerations below the preset value, and wherein the inhibiting force is of such magnitude that a pilot may overcome the inhibiting force by applying additional force to the control wheel.

A better understanding of the objects and advantages of the present invention will become apparent from the following description when taken in conjunction with the drawings in which.

Figure 1:
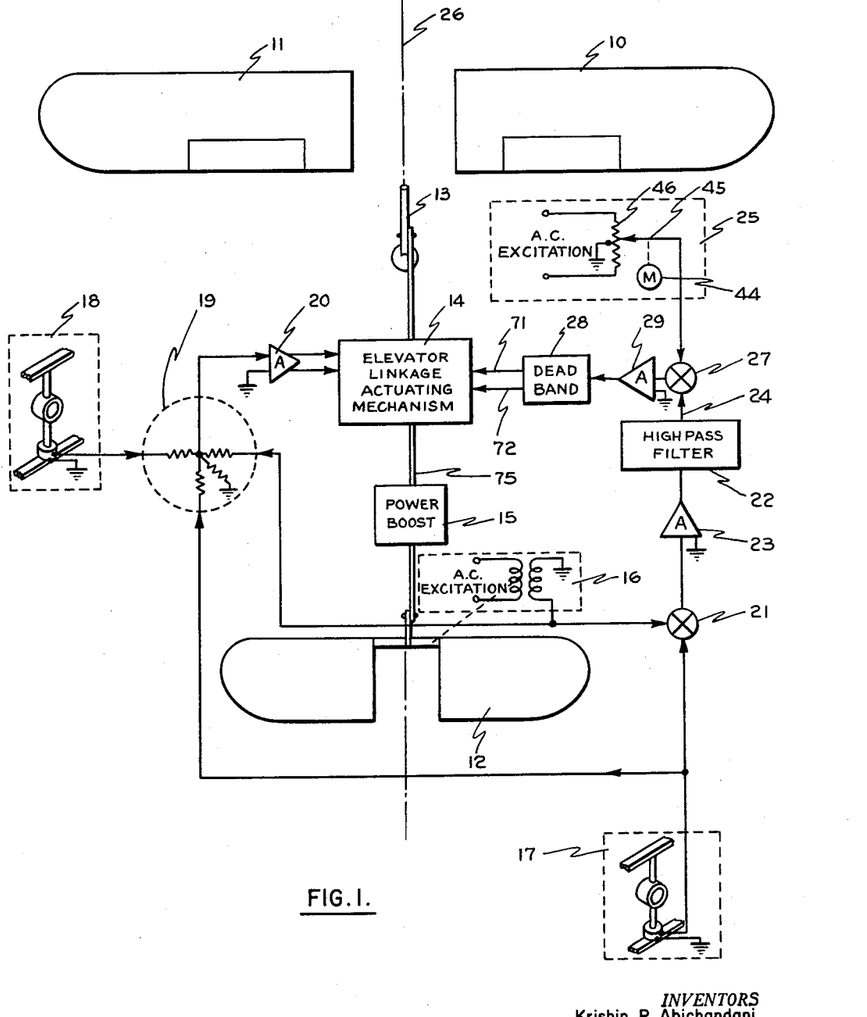
FIG. 1 is a partial block and schematic diagram of the invention.

Referring now to FIG. 1, there is illustrated aircraft wing surfaces 10 and 11 and an aircraft elevator surface 12. A control stick 13 is mechanically connected to the elevator control surface 12 by way of the elevator actuating mechanism 14 (to be described in detail later) and the power boost servo 15. It is to be noted that in this illustration we are considering only the elevator control surfaces 12 and the normal acceleration, that is, acceleration in a direction which is normal to both the pitch and roll axes. This system can be applied to any other control surface to limit acceleration in any given direction as the particular application dictates.

A surface position transducer 16 is positioned to detect movement in the normal manner of the elevator control surface 12 and emit an alternating current electrical signal proportional to the movement of the elevator surface 12 with respect to the aircraft. A pitch rate gyro 17 is positioned on the aircraft to detect the rate of pitch of the aircraft and emit an alternating current electrical signal proportional thereto. A vertical gyro 18 is positioned to detect pitch displacement and emit an alternating current electrical signal proportional in magnitude and phase to the displacement of the aircraft about the pitch axis. An adding circuit 19 is electrically connected to and is capable of electrically adding the outputs of the surface position transducer 16, the pitch rate gyro 17 and the vertical gyro 18. The elevator actuating mechanism 14 is electrically connected to receive the output of adding circuit 19 by way of amplifier 20.

A second adding circuit 21 is electrically connected to receive the outputs of the surface position transducer 16 and the pitch rate gyro 17. A high pass filter 22 is electrically connected to the output of the adder circuit 21 by way of amplifier 23. The high pass filter 22 is capable of allowing high frequency signals to pass to the output line 24 while suppressing any low frequency input signals below a predetermined frequency level. A normal accelerometer 25 detects acceleration parallel to the yaw axis 26 of the aircraft and emits an alternating current electrical signal proportional in magnitude and phase to the normal acceleration. A third adder 27 is electrically connected to receive and electrically add the outputs of the accelerometer 25 and high pass filter 22. A dead band circuit 28 is electrically connected by way of amplifier 29 to the output of adder circuit 27. The output of the dead band circuit 28 is electrically connected to the elevator actuating mechanism 14. The dead band circuit 28 allows a signal above a predetermined voltage level to pass to the elevator actuating mechanism 14.

Figure 2:
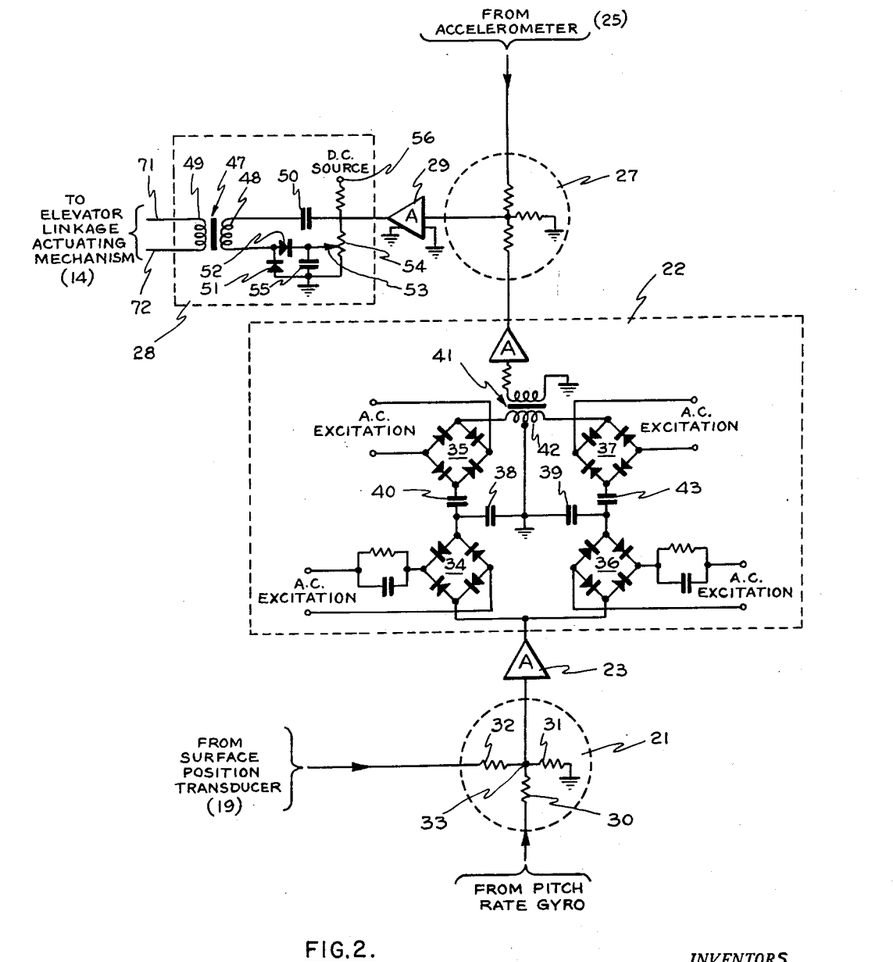
FIG. 2 is a typical schematic diagram of a portion of the invention.

In FIG. 2, there is shown a schematic diagram of some typical elements for the block diagram shown in FIG. 1. The adder circuit 21 comprises three resistors 30, 31 and 32. Each resistor is connected at respective first ends to a common point 33. The second end of resistor 30 is connected to the output of the pitch rate gyro 17. The second end of resistor 31 is connected to ground. The second end of resistor 32 is connected to the surface position transducer 16.

It can be seen now that the electrical signals emitted by the pitch rate gyro 17 and surface position transducer 16 are added in the usual manner at the junction point 33 and pass on to the amplifier 23. The gyro 17 and transducer 16 are phase sensitive and operate on a given frequency, e.g., 400 cycles per second.

Figure 4:
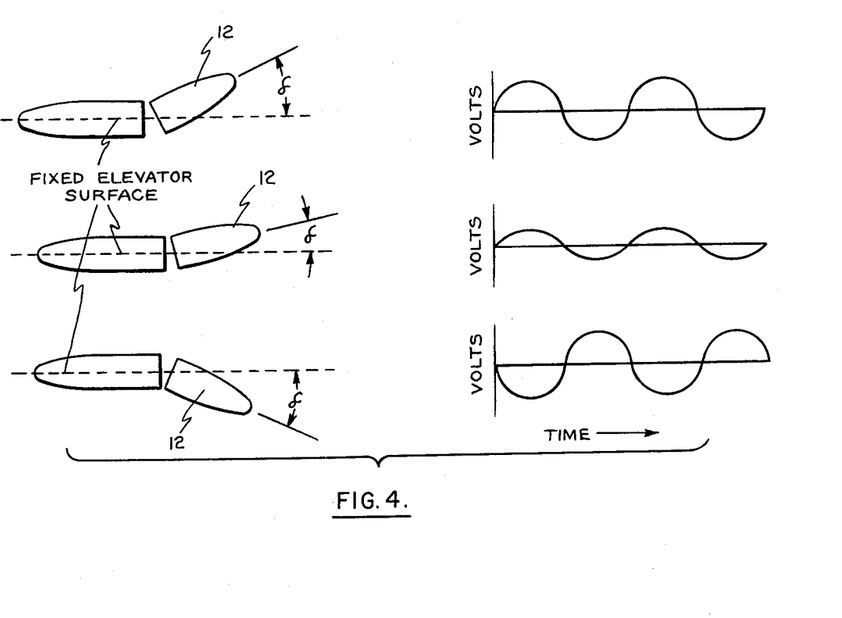
FIGS. 4 and 5 are graphs showing the electrical output of the surface position transducer and the pitch rate gyro.

FIG. 4 shows a typical wave form emitted by the surface position transducer 16. It can be seen that the voltage level of the wave form varies with the angle δ which is the angle of the elevator control surface 12 makes with the fixed elevator surface of the aircraft. Note that the wave form inverts or is displaced 180° as the surface 12 moves through the zero deflection position.

Figure 5:
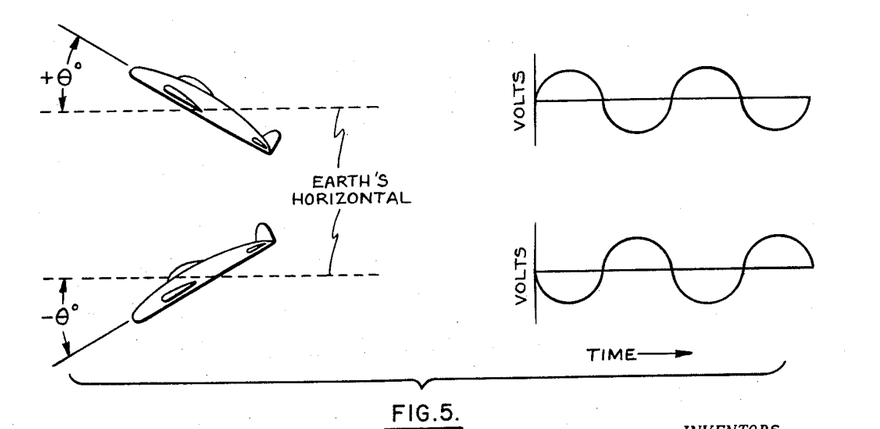
Figure 8:
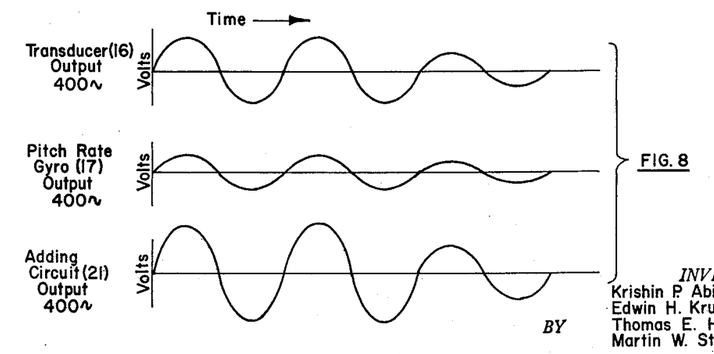
FIG. 8 is an illustration of the wave forms of the output signals of transducer 19 and gyro 20 and the additions of the same.

The output of the pitch rate gyro 17 is depicted in FIG. 5. The wave form here also inverts as the aircraft reverses direction of rotation, but the voltage level of the wave form is a function of the rate at which the aircraft moves relative to the earth's horizontal and not to the angle θ. The angle θ is the angle the aircraft makes with the earth's horizontal. Typical outputs of gyro 17 and transducer 16 and the addition of both are graphically shown in FIG. 8.

Figure 9:
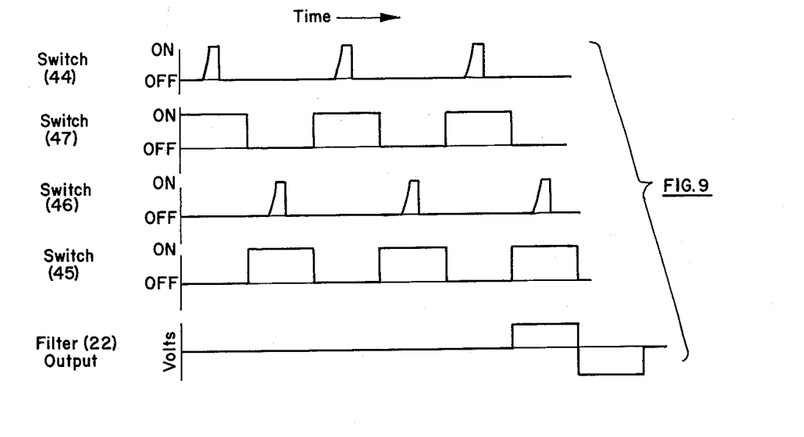
FIG. 9 illustrates the switching and output of filter 22.

Referring now to FIGS. 2 and 9 for a description of the high pass filter 22, there is shown four diode switches 34, 35, 36 and 37. The alternating current excitation to switches 34 and 37 is in phase with and of the same frequency as the transducer 16 and gyro 17 output signals and hence, in phase with and of the same frequency as the output alternating current signal of the adder circuit 21. The resistor-capacitor network between the alternating current excitation and the switch 34 causes the switch to be "On" or conducting only a portion of the time switch 37 is on or conducting during the first half cycle of the input signal for adder circuit 21 as shown in FIG. 9. By the same token, switches 35 and 36 are out of phase 180° with respect to switches 34 and 37 so that switches 35 and 36 are "On" or conducting during the second half cycles of the input signal from adder circuit 21. Now then, if switch 34 is "On," switch 36 will be "Off." A portion of the first half cycle of the input signal from the adder circuit 21 will pass through switch 34 and be stored in the capacitor 38. While switch 34 is off and switch 36 is on, a portion of the second half cycle of the alternating current input signal from the adder circuit 21 will pass through switch 36 and be stored in the capacitor 39. At the same time that switch 36 is on, switch 35 is on and hence the charge stored in the capacitor 38 is transferred to the capacitor 40. A transformer 41, having its primary coil 42 connected to switches 35 and 37 and a center tap to ground, is excited by the transfer of the electrical charge from capacitor 38 to the capacitor 40. When the switches 34 and 37 are in the conducting state again, the electrical charge stored in the capacitor 39 is transferred to capacitor 43 and transformer 41 is excited in the opposite direction by the resulting current flow. Note that after the initial signal has transferred from capacitor 38 to capacitor 40 only a new signal of different magnitude or polarity will cause the primary winding 42 to be excited. Therefore, as shown in FIG. 9, the output of filter 22 is 180° out of phase with the input and only as large in magnitude as the difference between the preceding alternate half cycles of the input signal to filter 22. It can be seen that if the frequency of the changes in signal magnitude is relatively small very little or no signal at all will appear across the primary winding 42 because of the normal attenuating effect of the capacitors in the circuit. Therefore, the filter passes only those changes in signal magnitude above a fixed frequency as determined by the values of the capacitors.

Considering now the accelerometer 25, a mass 44 is mechanically connected to the wiper arm 45. The mass 44 is suspended either in fluid or by means of a spring in the normal manner to maintain the wiper arm 45 in a neutral position. A resistance 46 is maintained stationary relative to the aircraft and is continually excited with an alternating current in phase with the output of the high pass filter 22. A normal acceleration causes the mass to move the wiper arm 45 and consequently the output of accelerometer 25 is in an alternating current electricl signal proportional in phase and magnitude to the movement of wiper arm 45.

Figure 10:
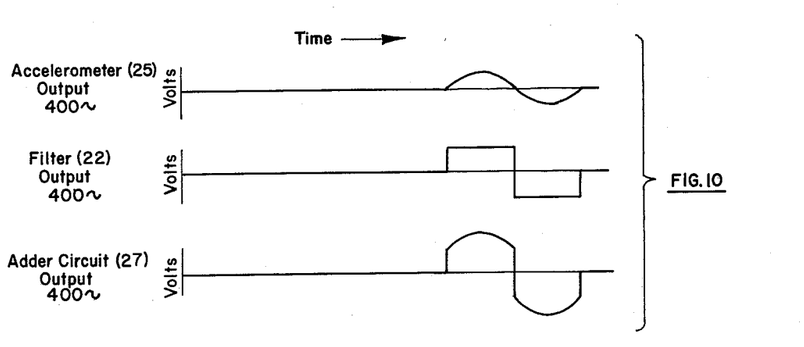
FIG. 10 is an illustration of the wave forms entering and leaving adder circuit 28.

The adder circuit 27 is similar to and functions in the same manner as adder circuit 21 to combine the output of the accelerometer 25 and high pass filter 22 as shown in FIG. 10.

Figure 11:
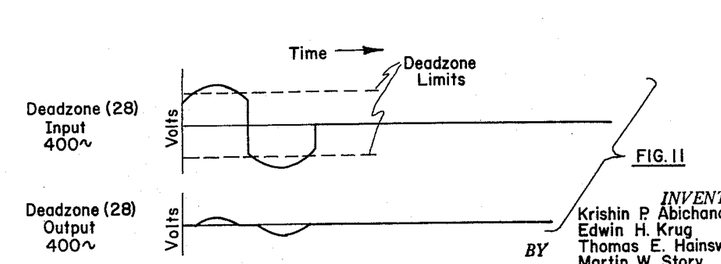
FIG. 11 is an illustration of the wave forms entering and leaving the dead band circuit 29.

The dead band circuit 28 comprises a transformer 47 having coils 48 and 49. One end of coil 48 is connected by way of blocking capacitor 50 and amplifier 29 to receive the output of adder circuit 27. The other end of the coil 48 is connected between diodes 51 and 52, the diode 51 being connected to electrical ground. The other side of diode 52 is connected to the wiper arm 53 of variable resistor 54. A by-pass capacitor 55 is connected between the wiper arm 53 and electrical ground. It can be seen that the direct current source 56 will back bias the diode 52 and thereby cause only that portion of the positive incoming signal above the back biasing to pass to the output. However, the direct current (average) voltage on the transformer side of the capacitor 50 will be half the total bias voltage. Thus the negative portion of the input signal must exceed half of the bias voltage in order to conduct through diode 51. Actually, the average voltage on a transformer side of the capacitor 50 will not be exactly half of the bias voltage when the input signal is less than the predetermined limit but will be near this value due to the diode leakage current. However, there cannot be a net direct current flow through the capacitor 50 and thus there cannot be an output unless the peak-to-peak input exceeds the dead zone voltage (bias voltage). When the input signal exceeds the dead zone voltage and the input is a symmetrical alternating current signal, the average voltage on the transformer side of capacitor 50 will be exactly half of the bias voltage. The input and output voltages of the dead zone 28 are shown graphically in FIG. 11.

Figure 3:
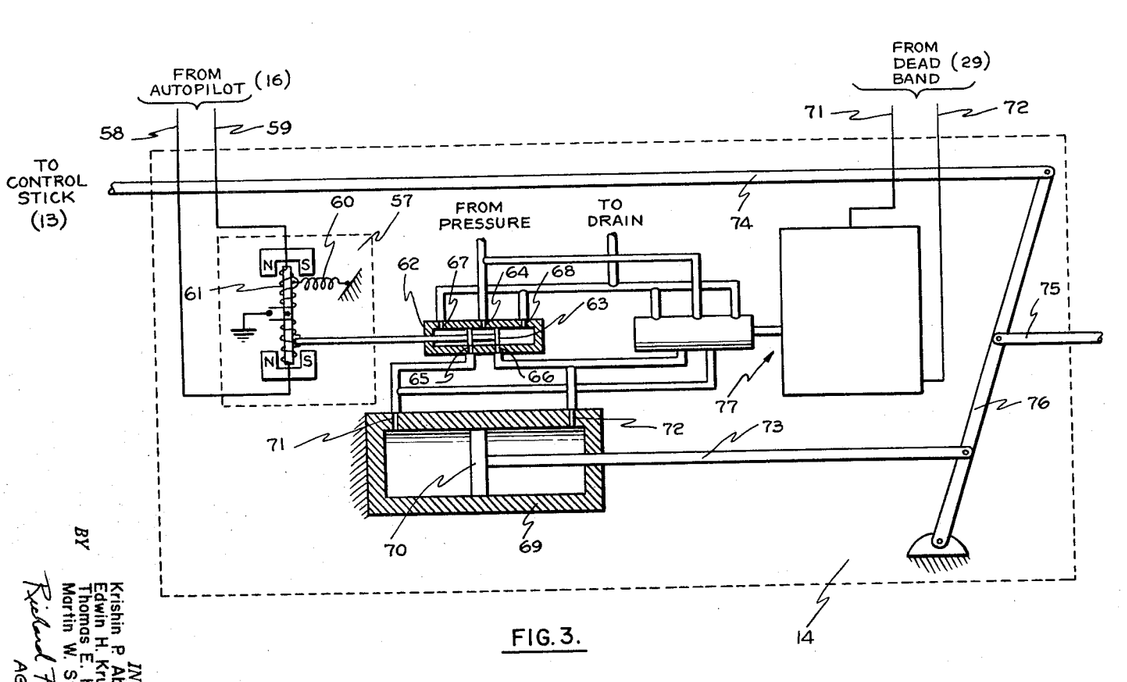
FIG. 3 is a sectional view showing one embodiment of the elevator actuating mechanism.

Referring now to FIG. 3 for the first embodiment of the elevator actuating mechanism 14, an electromagnetic switch 57 is electrically connected to the leads 58 and 59 from the amplifier 20. A spring 60 in the switch 57 has a first end connected to the aircraft and a second end connected to the armature 61 of the switch 57. A hydraulic valve 62 has spool piston 63 therein. The spool piston 63 is mechanically connected to the armature 61 of switch 57. The valve 62 has an input port 64 and two output ports 65 and 66 and two drain ports 67 and 68. It can be seen that as the armature 61 is caused to move by the electrical excitation from the amplifier 20, the spool 63 also moves within the valve 62 and causes more or less hydraulic pressure entering the port 64 to be transmitted to either one of the ports 65 and 66. A housing 69 contains a piston 70. Ports 71 and 72 in housing 69 connected to ports 65 and 66, respectively, are located on either side of the piston 70. A shaft 73 is connected at one end to the piston 70. The shaft 73 is mechanically connected to the control stick shaft 74 and the surface control shaft 75 by way of linkage 76.

It can be seen now that a command signal from the amplifier 20 energizes the switch 57 causing the spool valve 63 to move, which in turn allows fluid pressure to pass through the valve 62 to either side of the piston 70 thereby moving the control surfaces 12 by way of linkage 73, 75, 76, and power boost mechanism 15.

A switch valve system 77 identical to that just described is actuated by the output of the dead band network 28. It can be seen now that the two valve systems may operate simultaneously and when the aircraft approaches an excessive acceleration condition, the valve system 77 works in opposition to the valve 62 which is controlled by the amplifier 20. Hence, the output of the amplifier 20 will be overridden any time the aircraft approaches accelerations which would overload the structure of the aircraft.

To understand the operation of the present invention, consider the first mode of operation whereby the aircraft is in level flight and the amplifier 20 commands level flight. Therefore, the amplifier 20 emits a signal to the switch 57 so that the valve 62 transmits the correct pressure to the piston 70 to hold the elevator surfaces 12 in the correct position to allow the aircraft to maintain the level flight. In the first mode of operation, the normal accelerometer 25 does not sense any acceleration perpendicular to the roll axis 26 and longitudinal axis (not shown) and, therefore, there is no output from the normal accelerometer 25. Also the pitch rate gyro 17 does not sense a rate of change in the pitch of the aircraft, hence, no electrical signals are emitted by the pitch rate gyro 17. The surface position transducer 16 may sense a maximum angle δ and emit an electrical signal having little or no change in magnitude. This signal passes to the high pass filter, but is not of a frequency sufficient to pass through the high pass filter 22. Consequently, the commands from the amplifier 20 are transmitted to the elevator surface control 12 uninhibited.

Consider now the second mode of operation whereby the aircraft is in a nose up pitching rate approaching acceleration limits that would damage the structure and contents of the aircraft and either the pilot or the amplifier 20 is commanding an even higher pitching rate. Here the signal from the surface position transducer 16 is added in the adder circuit 21 with the output of the pitch rate gyro 17. Because the pitching rate is changing as well as the position of the surface 12, as commanded by the amplifier 20, the signals emitted by the transducer 16 and gyro 17 will be of a relatively high frequency and as explained above, the combined signal passes through the high pass filter to the adder 27. Since the aircraft has a pitching rate, the normal accelerometer 25 senses the normal acceleration and transmits a signal proportional thereto to the adder 27. The sum of the three signals then passes to the dead band circuit 28 and, since the aircraft is approaching acceleration limits, the combined signal is large enough in magnitude to allow that portion of the combined signal above the preset value of the dead band to operate the switch valve system 77 such that fluid pressure is fed to the piston 70 in a direction to cause the elevator surface control 12 to move in opposition to the commands of amplifier 20 and in a direction to lessen the amount of normal acceleration.

If the aircraft were now in a nose down pitching rate, it can be seen that the commands to the switch valve system 77 would be of the opposite polarity as in the second mode of operation and would direct the elevator surface control 12 to lessen the amount of the normal acceleration of the aircraft.

It is understood that it is mandatory that the ultimate in safety be installed in aircraft and to this end a dual system of the type described above might be used with both systems working on the piston 70.

Figure 6:
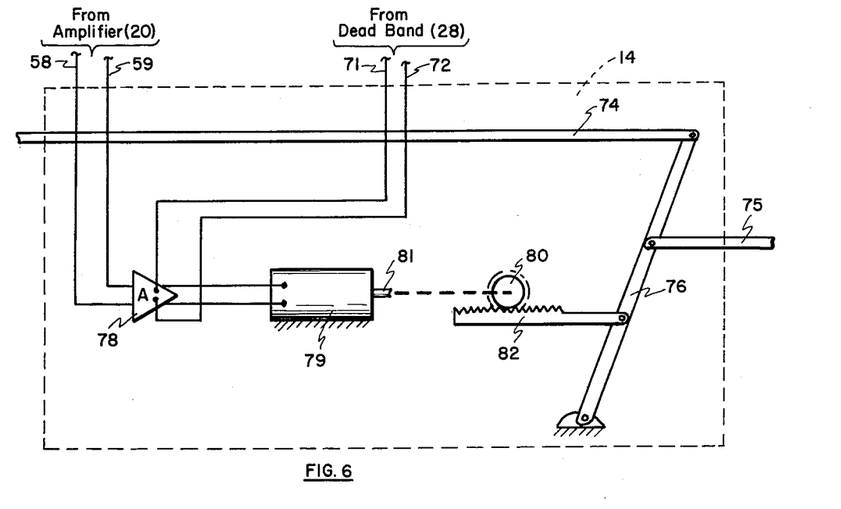
FIG. 6 is a schematic view showing a second embodiment of the elevator actuating mechanism.
Figure 7:
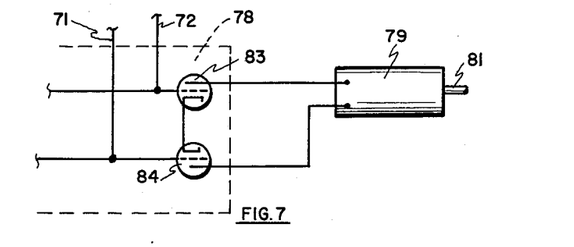
FIG. 7 is a schematic of the output stage of the amplifier shown in FIG. 6.

Referring now to FIGS. 6 and 7 for an explanation of the second embodiment of the present invention, there is shown a servo amplifier 78. A reversible servo motor 79 is electrically connected and responsive to the output of servo amplifier 78. A gear 80 is driven by the output shaft 81 of the servo motor 79 and a gear tooth rack 82 is in mesh with the gear 80. The gear tooth rack 82 is also mechanically connected to the linkage 76. Amplifier 78 is electrically connected to the output lines 58 and 59 from the amplifier 20 and the output stage of the amplifier 78 is electrically connected to the lines 71 and 72 from the dead band circuit 28. The output tubes 83 and 84 are normally energized and responsive to signals from the amplifier 20. However, any signal from the dead band circuit 28 also passes to the grids of the output tubes 83 and 84.

To understand the operation of the second embodiment of this invention note that the complete system, with the exception of the elevator actuator mechanism 14, functions in the same manner as described above for the first embodiment. In the second embodiment, when there is no output from the dead band circuit 28, the signals from the amplifier 20 pass to the amplifier 78 and subsequently drive the reversible servo motor 79 which in turn drives the gear 80 and gear tooth rack 82. The gear tooth rack 82 being connected to the linkage 76 causes movement of the elevator control surface 12 in response to rotation of the gear 80. It is understood that under normal conditions, the inputs to the output tubes 83 and 84 of amplifier 78 are dissimilar (for example, if the input to the grid of the tube 83 is positive), then the input to the grid of the tube 84 is negative and vice-versa. If the input to the tube 83, for example, negative and the aircraft approaches the normal acceleration limit, then the signal from the dead band 28 is positive and either cancels out and overcomes the negative signal or diminishes the negative signal thereby causing the servo 79 to be actuated in a direction to move the elevator control surface 12 in such a manner as to lessen the aircraft pitch rate and subsequently the normal acceleration. If the input to the tube 83 is, for example, positive and the plane approaches the normal acceleration limit, then the output from the dead band circuit 28 is negative and acts oppositely to that just described.

Note that the output of the servo amplifier 78 could be fed to two counter-rotating magnetic clutches to drive the control surface 12.

Although the present invention has been described with a certain degree of particularity, it is understood that various modifications in the details and arrangements of parts may be had without departing from the spirit and scope of the invention as hereinafter claimed.

We claim:
1. Apparatus for controlling a movement of an aircraft about a given axis comprising control surfaces to move said aircraft about an axis, first sensing means having an electrical output proportional to the rate of movement of said aircraft about said axis, second sensing means having an electrical output proportional to the displacement of said aircraft about said axis, third sensing means having electrical output proportional to the displacement of said control surfaces with respect to the neutral position, fourth sensing means having electrical output proportional to the acceleration of said aircraft, first adding means connected to add the electrical outputs of said first, second, and third sensing means, second adding means connected to the outputs of said first, third, and fourth sensing means, electrical limiting means connected to the output of said second adding means only when the output of said second adding means exceeds a predetermined level, combining means electrically connected to the outputs of said first adding means and said limiting means to combine the output of said first adding means in opposition to the output of said electrical limiting means and means connected and responsive to the output of said combining means to actuate said control surfaces.

2. Apparatus for controlling a movement of an aircraft about a gvien axis comprising control surfaces to move said aircraft about an axis, first sensing means having an electrical output proportional to the rate of movement of said aircraft about said axis, second sensing means having an electrical output proportional to the displacement of said aircraft about said axis, third sensing means having an electrical output proportional to the displacement of said control surfaces with respect to the neutral position, fourth sensing means having an electrical output proportional to the acceleration of said aircraft, first adding means connected to add the electrical outputs of said first, second, and third sensing means, actuating means connected to said control surfaces and responsive to the output of the said first adding means to actuate said control surface, second adding means connected to the outputs of said first, third and fourth sensing means, electrical limiting means connected to the output of said second adding means, said electrical limiting means having an output only when the output of said second adding means exceeds a pre-determined level, said actuating means connected to the output of said electrical limiting means such that the output of said electrical limiting means urges said actuating means in opposition to the output of said first adding means.

3. The device as claimed in claim 2, wherein said first sensing means senses the pitch rate of said aircraft, said second means senses the pitch displacement of said aircraft, and said third sensing means senses the movement of the pitch controls of said aircraft.

4. The device as claimed in claim 2, wherein said first sensing means senses the roll rate of said aircraft, said second means senses the roll displacement of said aircraft, and said third sensing means senses the movement of the roll controls of said aircraft.

5. The device as claimed in claim 2, wherein the said first sensing means senses the yaw rate of said aircraft, said second means senses the yaw displacement of said aircraft, and said third sensing means senses the movement of the yaw controls of said aircraft.

6. The device claimed in claim 2 wherein said actuating means is a hydraulic mechanism comprising a first valve connected and responsive to the output of said first adding means, a second valve connected and responsive to output of said electrical limiting means, said valves operating in opposition to hydraulically position said control surfaces.

7. The device as claimed in claim 2, wherein said electrical limiting means is set to allow electrical signals to pass to said actuating means when said acceleration sensing means electrical signal exceeds a predetermined level.

8. Apparatus for controlling movement of a vehicle about a given axis wherein the vehicle has a control surface to move the vehicle about the given axis, a first sensing means having an electrical output proportional to the rate of movement of the vehicle about the given axis, second sensing means having an electrical output proportional to the displacement of the vehicle about the axis, third sensing means having an electrical output proportional to the displacement of said control surface from a neutral position, and fourth sensing means having electrical output proportional to the acceleration of the vehicle, comprising: first adding means connected to add the electrical outputs of said first, second, and third sensing means, second adding means connected to the outputs of said first, third and fourth sensing means, electrical limiting means connected to the output of said second adding means only when the output of second adding means exceeds a predetermined level; combining means electrically connected to the outputs of said first adding means and said limiting means to combine the outputs of said first adding means in opposition to the output of said limiting means, and means connected and responsive to the output of said combining means to actuate said control surfaces.

9. An apparatus for controlling movement of a vehicle about a given axis wherein the vehicle has a control surface to move the vehicle about the given axis comprising: first sensing means having an electrical output proportional to the rate of movement of said aircraft about said axis, second sensing means having an electrical output proportional to the displacement of said aircraft about said axis, third sensing means having electrical output proportional to the displacement of said control surface with respect to the neutral position, fourth sensing means having electrical output proportional to the acceleration of said aircraft, first adding means connected to add the electrical outputs of said first, second, and third sensing means, second adding means connected to the outputs of said first, third, and fourth sensing means, electrical limiting means connected to the output of said second adding means only when the output of said second adding means exceeding a predetermined level, combining means electrically connected to the outputs of said first adding means and said limiting means to combine the output of said first adding means in opposition to the output of said electrical means and means connected and responsive to the output of said combining means to actuate said control surfaces.

10. The device as claimed in claim 8 wherein said electrical limiting means is set to allow electrical signals to pass to said combining means when said fourth sensing means electrical signal exceeds a predetermined level.

11. An apparatus for controlling movement of a vehicle about a given axis wherein the vehicle has a control surface to move the vehicle about the given axis comprising: first sensing means having an electrical output proportional to the rate of movement of said aircraft about said axis, second sensing means having an electrical output proportional to the displacement of said aircraft about said axis, third sensing means having an electrical output proportional to the displacement of said control surface with respect to the neutral position, fourth sensing means having an electrical output proportional to the acceleration of said aircraft, first adding means connected to add the electrical outputs of said first, second, and third sensing means, actuating means connected to said control surfaces and responsive to the output of the said first adding means to actuate said control surface, second adding means connected to the outputs of said first, third and fourth sensing means, electrical limiting means connected to the output of said second adding means, said electrical limiting means having an output only when the output of said second adding means exceeds a predetermined level, said actuating means connected to the output of said electrical limiting means such that the output of said electrical limiting means urges said actuating means in opposition to the output of said first adding means.

12. The device as claimed in claim 11 wherein said actuating means is a hydraulic mechanism comprising a first valve connected and responsive to the output of said first adding means, a second valve connected and responsive to output of said electrical limiting means, said valves operating in opposition to hydraulically position said control surfaces.

13. The device as claimed in claim 11 wherein said electrical limiting means is set to allow electrical signals to pass to said actuating means when said acceleration sensing means electrical signal exceeds a predetermined level.

References Cited in the file of this patent

UNITED STATES PATENTS

| | | |
|---|---|---|
| 2,764,370 | Yates | Sept. 25, 1956 |
| 2,770,429 | Schuck | Nov. 13, 1956 |
| 2,791,738 | Pringle | May 7, 1957 |
| 2,946,542 | Ciscel | July 26, 1960 |
| 2,978,210 | Larson | Apr. 4, 1961 |